United States Patent Office 3,562,287
Patented Feb. 9, 1971

3,562,287
ETHYL 3-(N-SUBSTITUTED-ACETIMIDOYL-AMINO) - 4H-PYRROLO[3,4-c]ISOXAZOLE-5(6H)-CARBOXYLATES
Shreekrishna Manmohan Gadekar, Trenton, and Bernard Dean Johnson, Montvale, N.J., and Elliott Cohen, Pearl River, N.Y., assignors to American Cyanamid Company, Stamford, Conn., a corporation of Maine
No Drawing. Filed Mar. 6, 1968, Ser. No. 710,770
Int. Cl. C07d 85/22, 85/40
U.S. Cl. 260—307                              9 Claims

ABSTRACT OF THE DISCLOSURE

This disclosure describes compounds of the class of ethyl 3-(N-substituted-acetimidoylamino)-4H-pyrrolo[3,4-c]isoxazole-5(6H)-carboxylates useful as diuretic agents.

BRIEF SUMMARY OF THE INVENTION

This invention relates to new organic compounds and, more particularly, is concerned with novel ethyl 3-(N-substituted-acetimidoylamino)-4H-pyrrolo[3,4-c]isoxazole-5(6H)-carboxylates and methods of preparing these compounds. The novel compounds of the present invention may be represented by the following general formula:

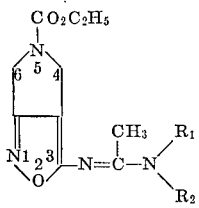

wherein $R_1$ is hydrogen or lower alkyl; $R_2$ is hydrogen, cyano, lower alkyl, lower cycloalkyl, phenyl lower alkyl, phenyl, halophenyl or trifluoromethylphenyl; and $R_1$ and $R_2$ taken together with the associated N(itrogen) atom is pyrrolidinyl, piperidinyl or morpholinyl. Suitable lower alkyl groups contemplated by the present invention are those having up to 4 carbon atoms such as methyl, ethyl, isopropyl, n-butyl, and the like. Phenyl lower alkyl is exemplified by benzyl, α-phenylethyl, β-phenylethyl, and the like. Trifluoromethylphenyl is o-, m- or p-trifluoromethylphenyl and typical lower cycloalkyl groups are cyclopropyl, cyclobutyl, cyclopentyl and cyclohexyl. Suitable halophenyl groups may be, for example, o-bromophenyl, m-chlorophenyl, p-fluorophenyl, etc. Halogen may be fluoro, chloro, bromo or iodo.

DETAILED DESCRIPTION OF THE INVENTION

The novel compounds of the present invention are generally obtainable as white crystalline materials having characteristic melting points and absorption spectra. The free bases are appreciably soluble in many organic solvents such as, for example, acetone, lower alkanols and dimethylformamide but are relatively insoluble in water.

The free bases of this invention form acid-addition salts with a variety of organic and inorganic salt-forming reagents. Thus acid-addition salts, formed by admixture of the organic free base with an equivalent amount of an acid, suitably in a neutral solvent, are formed with such acids as sulfuric, phosphoric, hydrochloric, hydrobromic, citric, lactic, tartaric, acetic, gluconic, ascorbic, and the like and the acid-addition salts so formed are soluble in water. For purposes of this invention, the organic free bases are equivalent to their acid-addition salts.

The novel ethyl 3-(N-substituted-acetimidoylamino)-4H-pyrrolo[3,4-c]isoxazole-5(6H)-carboxylates of the present invention may be readily prepared from ethyl 3-amino-4H-pyrrolo[3,4-c]isoxazole - 5(6H) - carboxylate as follows. Ethyl 3 - amino-4H - pyrrolo[3,4-c]isoxazole-5(6H)-carboxylate is treated with trimethyl orthoacetate and acetic anhydride at the reflux temperature of the reaction mixture for a period of about 3 hours whereby there is formed the intermediate ethyl 3-[(1-methoxyethylidene)amino]-4H - pyrrolo[3,4-c]isoxazole - 5(6H)-carboxylate. The ethyl 3-[(1-methoxyethylidene)amino]-4H - pyrrolo[3,4-c]isoxazole-5(6H)-carboxylate may be conveniently isolated as an oil or syrup merely by concentration of the reaction mixture and used directly in the next step. The intermediate ethyl 3-[(1-methoxyethylidene)amino]-4H-pyrrolo[3,4-c]isoxazole - 5(6H) - carboxylate is then treated with an amine of the formula

wherein $R_1$ and $R_2$ are as hereinabove defined. This reaction is conveniently carried out in an inert solvent such as chloroform or ethanol at from room temperature to the refluxing temperature of the reaction mixture over a period of time of from a few hours to 15 hours or more. The products are isolated and purified by standard procedures well known to those skilled in the art. Typical amines of the formula

which may be employed in this reaction are, for example, isopropylamine, diethylamine, cyclopropylamine, piperidine, N-methylaniline, N-methyl-o-chloroaniline, N-ethyl-p-fluoroaniline, N-(n-butyl)-p-trifluoromethylaniline, β-phenylethylamine, and the like.

When $R_1$ and/or $R_2$ in the above general formula is hydrogen then the compounds of the present invention may exist in another tautomeric form which can be represented as follows:

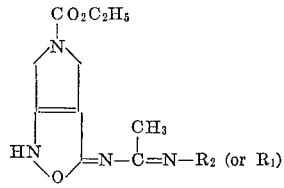

The description of one form of a compound of the present invention is intended to include the tautomer thereof. It is to be understood that when both $R_1$ and $R_2$ are other than hydrogen then another tautomeric form cannot exist.

The novel compounds of the present invention are physiologically effective as diuretic agents and were shown to possess diuretic activity when determined according to the following test procedure. Mature male rats weighing between 180 and 300 grams were allowed a normal fluid intake prior to testing. A single oral adiminstration of 25 mg. per rat of the test compound was given in 2% aqueous starch suspension. Four cages (2 rats per cage) served as controls for each measurement. Control animals received only the starch suspension. After administration, the test animals were placed in metabolism cages and observations of the amount of urine excreted were made after 5 hours and after 24 hours. These urine measurements were then adjusted to compensate for differing weights of individual animals. The final values recorded were the ratios of the adjusted amount of urine excreted by the test rats to the adjusted amount of urine excreted by the control rats. In a representative operation, and merely by way of illustration, ethyl 3-(N-ethylacetimidoylamino) - 4H - pyrrolo[3,4-c]isoxazole-5(6H)-carboxylate and ethyl 3-(N-cyclohexylacetimidoylamino)-4H-pyrrolo[3,4-c]-isoxazole - 5(6H)-carboxylate are active diuretics when tested in this procedure.

When mixed with suitable excipients or diluents, the compounds of this invention can be prepared as pills, capsules, tablets, solutions, suspensions, and the like for unit dosage and to simplify administration. As diuretics, they selectively enhance the excretion of sodium ions without causing an increase in excretion of potassium ions.

The invention will be described in greater detail in conjunction with the following specific examples.

EXAMPLE 1

Preparation of ethyl 3-(acetimidoylamino)-4H-pyrrolo[3,4-c]isoxazole-5(6H)-carboxylate A mixture containing 3.94 g. (0.02 mole) of ethyl 3-amino - 4H - pyrrolo[3,4-c]isoxazole-5(6H)-carboxylate, 6.2 ml. of acetic anhydride and 4 ml. of trimethyl orthoacetate was refluxed for 3 hours. The reaction mixture was evaporated in vacuo to a syrup which was allowed to react with 10 ml. of 7% ethanolic ammonia solution at room temperature overnight. The amidine was filtered off and was recrystallized from water. It weighed 2.06 g. (43%) and melted at 168–174° C.

EXAMPLE 2

Preparation of ethyl 3-(N-methylacetimidoylamino)-4H-pyrrolo[3,4-c]isoxazole-5(6H)-carboxylate A mixture containing 2.0 g. (0.01 mole) of the aminoisoxazole, 3.1 ml. of acetic anhydride and 4 ml. of trimethyl orthoacetate was refluxed for 3 hours and evaporated to a syrup. This was allowed to react with a solution of methylamine in ethanol. In a few hours the amidine precipitated, was filtered and recrystallized from methanol to give 0.74 g. (29.4%) of a crystalline solid melting at 141–145° C.

EXAMPLE 3

Preparation of ethyl 3-(N-dimethylacetimidoylamino)-4H-pyrrolo[3,4-c]isoxazole-5(6H)-carboxylate A mixture of 2.0 g. (0.01 mole) of the aminoisoxazole, 1.6 ml. of acetic anhydride and 2.4 ml. of trimethyl orthoacetate was refluxed for 3 hours and evaporated to an oil. This oil was treated with a solution of anhydrous dimethylamine in chloroform. The mixture after standing overnight at room temperature was filtered and the filtrate was evaporated under diminished pressure to an oil. The oil was dissolved in hot water and on cooling the amidine separated out. It weighed 0.12 g. (23%) and melted at 92–96° C.

EXAMPLE 4

Preparation of ethyl 3-(N-ethylacetimidoylamino)-4H-pyrrolo[3,4-c]isoxazole-5(6H)-carboxylate A mixture of 2.0 g. (0.01 mole) of the aminoisoxazole, 3.1 ml. of acetic anhydride and 4 ml. of trimethyl orthoacetate was refluxed and processed as described in Example 3. The resultant oil was treated with 0.9 g. (0.02 mole) of ethylamine in 20 ml. of chloroform. The reaction after standing overnight at room temperature was evaporated to an oil. This was dissolved in a minimum amount of methanol to give 1.67 g. (63%) of the crystalline amidine melting at 152–154° C.

EXAMPLE 5

Preparation of ethyl 3-(N-cyclohexylacetimidoylamino)-4H-pyrrolo[3,4-c]isoxazole-5(6H)-carboxylate The reaction of 2.0 g. (0.01 mole) of the aminoisoxazole with acetic anhydride, trimethyl orthoacetate followed by treatment with 2.0 g. (0.02 mole) of cyclohexylamine as described in Example 2 afforded 1.44 g. (45%) of the cyclohexylamidine. It melted at 167–171° C.

EXAMPLE 6

Preparation of ethyl 3-[1-(1-pyrrolidinyl)ethylideneamino] - 4H - pyrrolo[3,4 - c]isoxazole - 5(6H) - carboxylate The reaction of 2.0 g. (0.01 mole) of the aminoisoxazole with acetic anhydride, trimethyl orthoacetate followed by treatment with 1.42 g. (0.02 mole) of pyrrolidine as described in Example 2 gave 1.6 g. (55%) of the pyrrolidinyl amidine melting at 116–119° C.

EXAMPLE 7

Preparation of ethyl 3 - (N - cyanoacetimidoylamino)-4H-pyrrolo[3,4-c]isoxazole-5(6H)-carboxylate A mixture containing 2.0 g. (0.01 mole) of the aminoisoxazole, 3.1 ml. of acetic anhydride and 4 ml. of trimethyl orthoacetate was refluxed for 3 hours and was evaporated in vacuo to a syrup. It was mixed with a solution of 0.84 g. (0.02 mole) of anhydrous cyanamide in 5 ml. of dry ethanol. The mixture was refluxed for 2 hours and then was allowed to stand at room temperature overnight. The solid that separated was filtered off and the filtrate was reduced to a syrup. Trituration of this with water provided 0.14 g. (5%) of the desired amidine melting at 197–200° C. It was recrystallized from aqueous methanol.

EXAMPLE 8

Preparation of ethyl 3-(N-phenylacetimidoylamino)-4H-pyrrolo[3,4-c]isoxazole-5(6H)-carboxylate The reaction of 2.0 g. (0.01 mole) of the aminoisoxazole with 4 ml. of trimethyl orthoacetate and 3.1 ml. of acetic anhydride followed by the treatment of the resulting gum with 1.86 g. (0.02 mole) of aniline as described in Example 7 afforded 1.85 g. (59%) of this amidine which melted at 211–214° C.

EXAMPLE 9

Preparation of ethyl 3-[N-(m-chlorophenyl)acetimidoylamino]-4H-pyrrolo[3,4-c]isoxazole-5(6H)-carboxylate The reaction of 2.0 g. (0.01 mole) of the aminoisoxazole with acetic anhydride and trimethyl orthoacetate followed by the treatment of the resulting gum with 2.54 g. (0.02 mole) of m-chloroaniline as described in Example 7 afforded 0.85 g. (24.5%) of the amidine melting at 205–208° C.

EXAMPLE 10

Preparation of ethyl 3-[N-($\alpha,\alpha,\alpha$-trifluoro-m-tolyl)acetimidoylamino]-4H-pyrrolo[3,4-c]isoxazole-5(6H) - carboxylate A mixture of 2.0 g. (0.01 mole) of the aminoisoxazole, 4 ml. of trimethyl orthoacetate and 2.1 ml. of acetic anhydride was refluxed for 3 hours and was evaporated in vacuo to a syrup. This was treated with 3.2 g. (0.02 mole) of m-trifluoromethylaniline as described in Example 7. The amidine weighed 1.2 g. (31%) and melted at 226–229° C.

EXAMPLE 11

Preparation of ethyl 3-(N-benzylacetimidoylamino)-4H-pyrrolo[3,4-c]isoxazole-5(6H)-carboxylate A mixture of 2.0 g. (0.01 mole) of the aminoisoxazole 8 ml. of trimethyl orthoacetate and 6.2 ml. of acetic anhydride was refluxed for 3 hours and was evaporated to a syrup. Treatment of the syrup with 2.14 g. (0.02 mole) of benzylamine in 10 ml. of ethanol as described in Example 2 afforded 1.75 g. (53.4%) of the desired amidine melting at 140–150° C.

EXAMPLE 12

Preparation of ethyl 3-cyano-4-oximino-pyrrolidine-1-carboxylate

A mixture containing 8.0 g. (0.04 mole) of 1-carbethoxy-3-cyano-4-pyrrolidone, 2.8 g. (0.04 mole) of hydroxylamine hydrochloride, 3.3 g. of sodium acetate and 100 ml. of 95% ethanol is refluxed for 2 hours. The mixture is filtered and the filtrate is evaporated to an oily residue which crystallized when standing in the cold. The solid is recrystallized from a mixture of n-hexane and ethyl acetate yielding 3.3 g. (42% yield), melting point 131–132° C.

EXAMPLE 13

Preparation of ethyl 3-amino-4H-pyrrolo[3,4-c]-isoxazole-5(6H)-carboxylate

A 1.1 g. (0.0056 mole) quantity of the oxime from Example 12 is dissolved in 10 ml. of 0.1 N sodium hydroxide. A solid precipitates from the clear solution which is filtered off, washed with ice-water and dried, 0.9 g. (82% yield), melting point 177°–179° C. dec.

What is claimed is:

1. A compound selected from the group consisting of those of the formula:

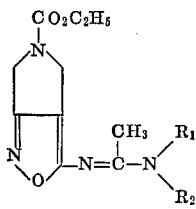

wherein $R_1$ is selected from the group consisting of hydrogen and lower alkyl; $R_2$ is selected from the group consisting of hydrogen, cyano, lower alkyl, lower cycloalkyl, phenyl lower alkyl, phenyl, halophenyl and trifluoromethylphenyl; and $R_1$ and $R_2$ taken together with the associated N(itrogen) atom is selected from the group consisting of pyrrolidinyl, piperidinyl and morpholinyl; the tautomers thereof; and the non-toxic acid-addition salts thereof.

2. A compound according to claim 1 wherein $R_1$ is hydrogen and $R_2$ is ethyl.
3. A compound according to claim 1 wherein $R_1$ is hypdrogen and $R_2$ is cyclohexyl.
4. A compound according to claim 1 wherein $R_1$ is hydrogen and $R_2$ is benzyl.
5. A compound according to claim 1 wherein $R_1$ is hydrogen and $R_2$ is $\alpha,\alpha,\alpha$-trifluoro-m-tolyl.
6. A compound according to claim 1 wherein $R_1$ is hydrogen and $R_2$ is m-chlorophenyl.
7. A compound according to claim 1 wherein $R_1$ is methyl and $R_2$ is methyl.
8. A compound according to claim 1 wherein $R_1$ is hydrogen and $R_2$ is cyano.
9. A compound according to claim 1 wherein $R_1$ is hydrogen and $R_2$ is hydrogen.

References Cited
UNITED STATES PATENTS 3,309,368  3/1967  Gadekar et al. _____ 260—307

ALTON D. ROLLINS, Primary Examiner

U.S. Cl. X.R.

260—247.1, 247.2, 294.3; 424—248, 267, 272